United States Patent [19]

Midorikawa et al.

[11] Patent Number: 5,122,780
[45] Date of Patent: Jun. 16, 1992

[54] FAULT DETECTION DEVICE FOR OCCUPANT PROTECTIVE SYSTEMS

[75] Inventors: Yukinori Midorikawa, Yamato; Akihisa Amada, Fujisawa, both of Japan

[73] Assignee: Nippon Seiko Kabushiki Kaisha, Tokyo, Japan

[21] Appl. No.: 500,409

[22] Filed: Mar. 28, 1990

[30] Foreign Application Priority Data

Apr. 15, 1989 [JP] Japan ............................ 1-43900[U]

[51] Int. Cl.$^5$ .............................................. B60Q 1/00
[52] U.S. Cl. .................................... 340/438; 180/282; 280/735; 340/436
[58] Field of Search ............ 340/436, 438, 425.5; 180/271, 282; 280/735; 307/10.1

[56] References Cited

U.S. PATENT DOCUMENTS

| 3,622,974 | 11/1971 | Best et al. | 340/438 |
| 3,818,431 | 6/1974 | Hosaka | 340/438 |
| 4,641,041 | 2/1987 | Mattes et al. | 340/438 |
| 4,893,109 | 1/1990 | Vrabel et al. | 340/436 |

Primary Examiner—Jin F. Ng
Assistant Examiner—Brent A. Swarthout
Attorney, Agent, or Firm—Arthur L. Lessler

[57] ABSTRACT

A fault detection device for an occupant protective system for use in an automotive vehicle, which has a plurality of squibs connected in parallel with each other. A common signal is generated for actuating the squibs to operate the system when the vehicle undergoes deceleration in excess of a predetermined value. A squib circuit has the squibs, at least one resistance connected to the squibs in such a manner that a slight amount of current flows through the squibs, and a unilateral conductive element connected to the squibs and the resistance in such a manner that the slight amount of current flows through the squibs in a predetermined single direction. A fault detection circuit detects a fault in any of the squibs based on a potential at a predetermined location in the squib circuit.

8 Claims, 5 Drawing Sheets

FAULT DETECTION DEVICE FOR OCCUPANT PROTECTIVE SYSTEMS

BACKGROUND OF THE INVENTION

This invention relates to a fault detection device for occupant protective systems for use in automotive vehicles, and more particularly to such a device which detects faults in squibs used in the occupant protective systems.

Occupant protective systems, such as an inflatable air bag system using gas-inflatable air bags, and a pre-tensioning system which tensions a seat belt when an accident occurs, have conventionally been used to protect occupants in automotive vehicles in the event that the vehicle is involved in a crash, for instance.

In order to detect faults in squibs for actuating respective air bags or pre-tensioners, a fault detection device has been proposed e.g. by Japanese Provisional Patent Publication (Kokai) No. 60-206753, which includes a plurality of fault detection circuits to detect faults in respective squibs.

An occupant protective system of this kind usually employs a plurality of air bags or pre-tensioners which are arranged at a driver's seat and an assistant driver's seat of a vehicle, for instance.

However, having a plurality of fault detection circuits which detect faults in the respective squibs separately from each other, the proposed fault detection device requires an increased number of component parts, resulting in an increased manufacturing cost as well as difficult maintenance and inspection of the device.

SUMMARY OF THE INVENTION

It is therefore the object of the invention to provide a fault detection device for occupant protective systems for use in automotive vehicles, which employs a single fault detection circuit to detect a plurality of squibs and hence has a reduced number of circuit parts, thereby reducing the manufacturing cost, and facilitating the maintenance and inspection.

To achieve the object of the invention, the present invention provides a fault detection device for an occupant protective system for use in an automotive vehicle having a plurality of squibs connected in parallel with each other, and means for generating a signal for actuating the squibs to operate the system when the vehicle undergoes deceleration in excess of a predetermined value.

The fault detection device according to the present invention is characterized by an improvement comprising: a squib circuit having the squibs, at least one resistance connected to the squibs in a manner such that a slight amount of current flows through the squibs, and a unilateral conductive element connected to the squibs and the at least one resistance in a manner such that the slight amount of current flows through the squibs in a predetermined single direction; and a fault detection circuit for detecting a fault in any of the squibs based on a potential at a predetermined location in the squib circuit.

In a first preferred form, the fault detection device includes a power supply, and wherein the squib circuit comprises a first resistance having one end thereof connected to the power supply, a second resistance having one end thereof grounded, first and second squibs serially connected between the first and second resistances, and a diode having a cathode terminal thereof connected to a first junction between the first resistance and the first squib, and an anode terminal thereof connected to a second junction between the second resistance and the second squib.

Preferably, in the first preferred form, the fault detection circuit comprises a comparator having one input terminal thereof connected to a predetermined point in the squib circuit, and another input terminal thereof supplied with a predetermined reference voltage, and means for giving a warning based upon an output of the comparator.

In a second preferred form, the fault detection device includes a power supply, and wherein the squib circuit comprises a first resistance having one end thereof connected to the power supply, a second resistance having one end thereof grounded, first and second squibs serially connected between the first and second resistances, a diode having a cathode terminal thereof connected to a first junction between the first resistance and the first squib, and an anode terminal thereof connected to a second junction between the second resistance and the second squib, and a plurality of third resistances connected, respectively, in parallel with the first and second squibs.

Preferably, in the second preferred form, the fault detection device may comprise a plurality of comparators having respective one input terminals thereof connected to a predetermined point in the squib circuit, and respective other input terminals thereof supplied with predetermined reference voltages different in value from each other, and means for giving a plurality Of different warnings based upon combinations of respective outputs of the comparators.

In the first and second preferred forms, switching means may be connected between the power supply and the second junction in parallel with the first resistance, the switching means being closed when the vehicle undergoes deceleration in excess of the predetermined value.

In a third preferred form, the fault detection device includes a power supply, and wherein the squib circuit comprises a resistance having one end thereof grounded, first and second squibs serially connected between the power supply and the resistance, and a diode having an anode terminal thereof connected to the power supply in parallel with the first and second squibs, and a cathode terminal thereof connected to a junction between the second squib and the resistance.

The above and other objects, features, and advantages of the invention will become more apparent from the ensuing detailed description taken in conjunction with the accompanying drawings.

DETAILED DESCRIPTION

The invention will now be described in detail with reference to the drawings showing embodiments thereof.

Figure 1:
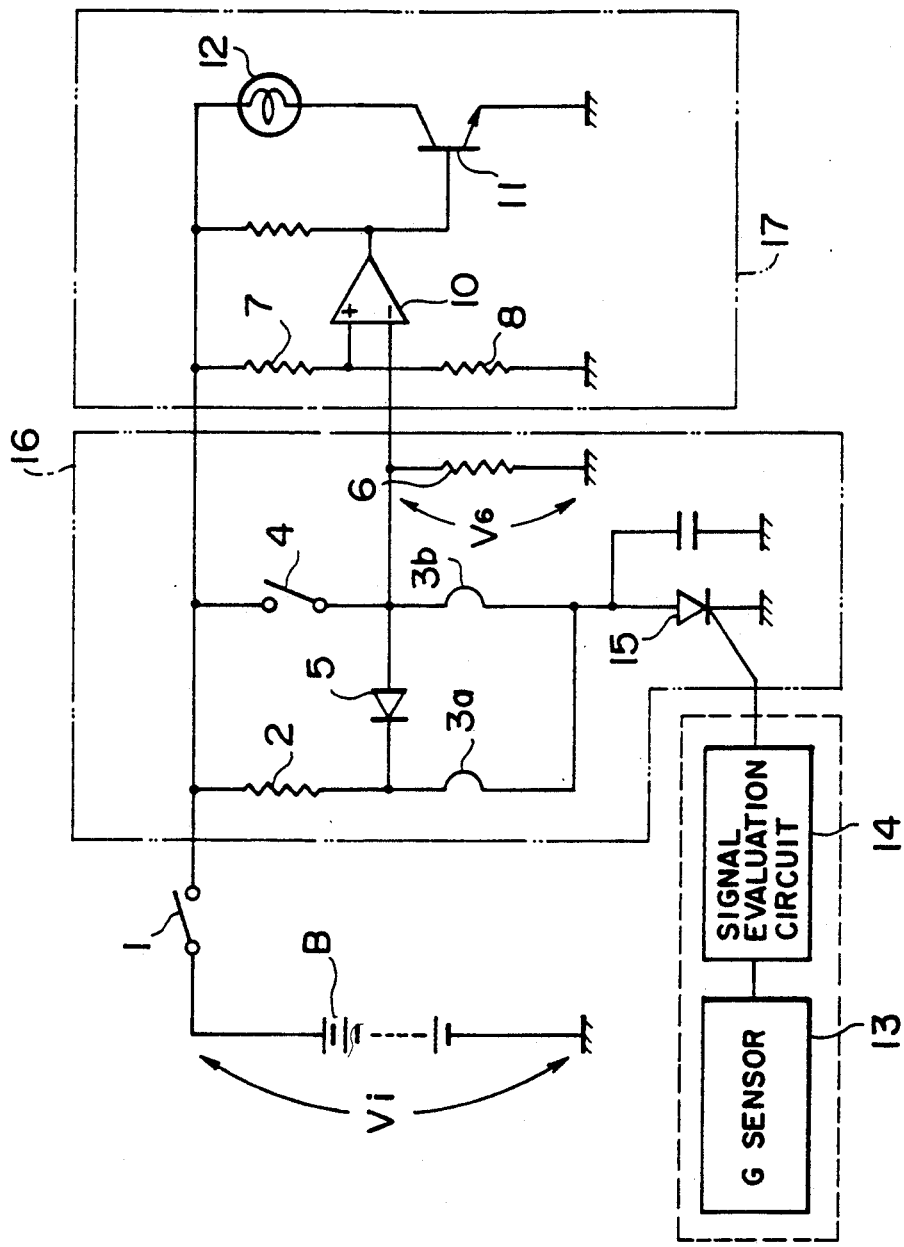
FIG. 1 is a circuit diagram of a fault detection device according to a first embodiment of the invention.

Referring first to FIG. 1, there is illustrated a fault detection device for an occupant protective system according to a first embodiment of the invention. The fault detection device comprises a squib circuit 16 for actuating gas generators, not shown, of an occupant protective system such as an inflatable air bag system, and a pre-tensioning system and a fault detection circuit 17 for detecting faults in squibs forming parts of the squib circuit 16.

An ignition switch 1 is connected to a battery B as a power supply, to be opened and closed in unison with operation of a starting switch, not shown, of an automotive vehicle in which the fault detection device is installed. The squib circuit 16 includes two squibs 3a, 3b connected in parallel with each other and forming parts of the gas generators. Each squib 3a, 3b is formed by a heating wire of a known type having an internal resistance of several ohms, and ignites an explosive within the gas generator when a predetermined amount or more of current is supplied through the squib 3a, 3b. The squibs 3a, 3b are arranged in the vehicle at a driver's seat and an assistant driver's seat, respectively.

In the squib circuit 16, two resistances 2, 6 are serially connected between the ignition switch 1 and ground, with the squibs 3a, 3b interposed therebetween to cause a slight amount of current to flow through the squibs. The resistance 2 has one end thereof connected to the ignition switch 1 and the other end to one end of the squib 3a, and the resistance 6 is connected between one end of the squib 3b and ground. A diode 5 as a unilateral conductive element has a cathode terminal thereof connected to the junction between the resistance 2 and the squib 3a and an anode terminal thereof to the junction between the squib 3b and the resistance 6, so that when the ignition switch 1 is closed, normally a slight amount of current flows in a predetermined single direction, i.e from the battery B through the ignition switch 1, the resistance 2, the squib 3a, the squib 3b, and the resistance 6 in the mentioned order.

A deceleration sensing switch 4, which may be a conventionally-known mercury switch, is connected between the ignition switch 1 and the one end of the squib 3b in parallel with the resistance 2. The switch 4 is a normally-open type and adapted to close when the vehicle undergoes deceleration in excess of a predetermined value.

A thyristor 15 is connected between the junction (between the squibs 3a, 3b, and ground. The thyristor 15 has a gate terminal thereof connected to an output of a signal evaluation circuit 14 connected to a crash sensor (G sensor) 13 so that when the vehicle undergoes deceleration in excess of the predetermined value, a signal is generated from the G sensor 13 and supplied to the thyristor 15 through the signal evaluation circuit 14.

On the other hand, the fault detection circuit 17 includes a comparator 10 which has a non-inverting input terminal thereof connected to the junction between a resistance 7 and a resistance 8, which cooperate to form a series circuit for creating a predetermined reference voltage, and an inverting input terminal thereof connected to the junction between the squib 3b and the resistance 6. The comparator 10 has an output terminal thereof connected to a transistor 11 for driving an indicator lamp 12.

The operation of the fault detection device arranged as above will be described hereinbelow.

When the ignition switch 1 is closed, the squib circuit 16 is supplied with voltage from the battery B. When the vehicle is involved in a crash, for instance, to undergo deceleration in excess of the predetermined value, the deceleration sensing switch 4 becomes closed, and at the same time the G sensor 13 generates a signal and supplies same to the signal evaluation circuit 14. The signal evaluation circuit 14 in turn supplies a signal to the thyristor 15 to thereby turn the latter on, when the signal from the G sensor 13 shows an impact larger than a predetermined value. On this occasion, if two conditions, i.e. (1) the deceleration sensing switch 4 is closed, and (2) the thyristor 15 is turned on, are both satisfied, a power supply voltage Vi from the power supply B is applied through the closed deceleration sensing switch 4 to the squib 3b directly as well as to the squib 3a through the diode 5, thereby causing the occupant protective system to operate for protection of occupants.

On the other hand, when the vehicle undergoes normal deceleration below the predetermined value, the deceleration sensing switch 4 remains open. On this occasion, if there is no disconnection in either of the squibs 3a, 3b, a slight amount of current flows from the battery B through the ignition switch 1, the resistance 2, the squib 3a, the squib 3b, and the resistance 6 in the mentioned order, whereby a fault detection voltage $V_6$ is developed across the resistance 6. The fault detection voltage $V_6$ is supplied to the inverting input terminal of the comparator 10, and compared with the predetermined reference voltage at the junction between the resistances 7, 8. The slight amount of current flows through the resistance 2, the squib 3a, the squib 3b, and the resistance 6 while no current flows through the diode 5, whereby the fault detection volta $V_6$ is higher than the predetermined reference voltage. Consequently, the output level of the comparator 10 remains low so that the transistor 11 remains off, and the indicator light 12 remains deenergized.

However, if a disconnection or disconnections occurs in one or both of the squibs 3a, 3b, no current is supplied to the resistance 6 through any of the diode 5 and the squibs 3a, 3b so that the fault detection voltage $V_6$ assumes 0V lower than the predetermined reference voltage. Consequently, the output level of the comparator 10 goes high so that the transistor 11 is turned on to cause the indicator lamp 12 to be lit for indication of the disconnection of one or both of the squibs 3a, 3b.

Figure 2:
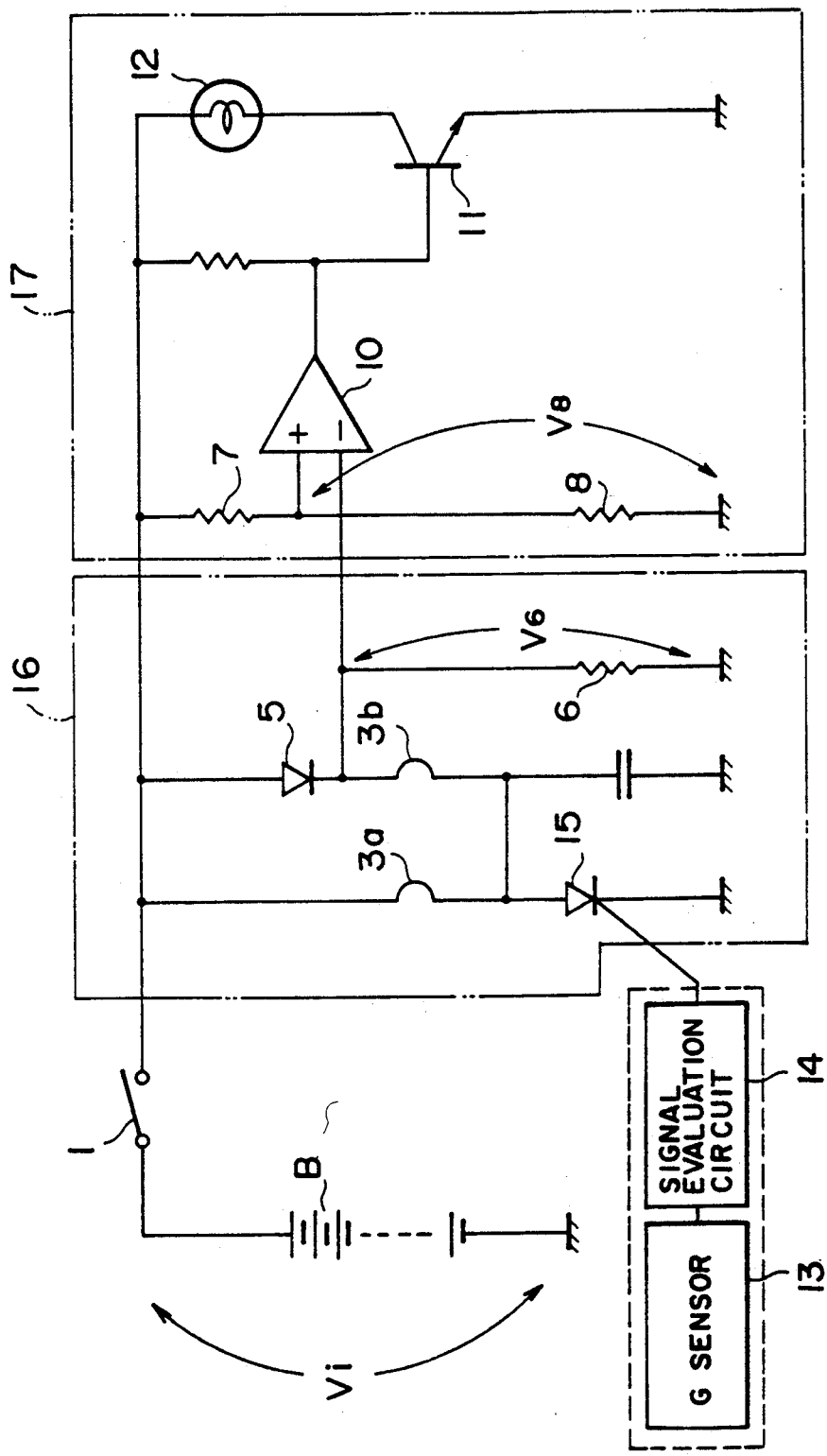
FIG. 2 is a circuit diagram of a second embodiment of the invention.

FIG. 2 shows a second embodiment of the invention. The second embodiment is different from the first embodiment in that the resistance 2 and the deceleration sensing switch 4 are omitted, and the unilateral conductive diode 5 is connected in a different manner from the first embodiment. In FIG. 2, the same reference numerals are used to designate component parts like or corresponding to those of the first embodiment shown in FIG. 1, and detailed description thereof is therefore omitted. In the second embodiment, the squib 3a is directly connected to the ignition switch 1, and the diode 5 is connected to the resistance 6 in parallel with the squibs 3a, 3b. The diode 5 has a cathode terminal thereof connected to one end of the squib 3b and an anode terminal thereof to the ignition switch 1.

When the vehicle undergoes normal deceleration below the predetermined value without disconnection in the squibs 3a, 3b, a slight amount of current flows through the squib 3a, the squib 3b, and the resistance 6 in the mentioned order, whereby a fault detection voltage $V_6$ is developed across the resistance 6. Since the internal resistance R of the squibs 3a, 3b is much smaller than that of the diode 5, the slight amount of current flows through the squibs 3a, 3b without flowing through the diode 5, to the resistance 6. The fault detection voltage $V_6$ is applied to the comparator 10, and compared with the predetermined reference volta $V_8$ at the junction between the resistances 7, 8.

The fault detection voltage $V_6$ changes depending upon the presence or absence of disconnection in the squibs 3a, 3b, as below, provided that the resistance value of the resistance 6 is $R_6$, and the voltage drop across the diode 5 is $V_{D5}$ (usually about 0.7 V):

(1) When there is no disconnection in either of the squibs 3a, 3b, $$V_{6-0} = \frac{R6}{2R + R6} Vi$$

(2) When there is a disconnection or disconnections in one or both of the squib 3a, 3b, $$V_{6-1} = Vi - V_{D5}$$

On the other hand, the resistance values of the resistances 7, 8 are set such that the predetermined reference voltage $V_8$ applied to the non-inverting terminal of the comparator 10 falls between the values $V_{6-0}$ and $V_{6-1}$ ($V_{6-0} > V_8 > V_{6-1}$). Consequently, when the squibs 3a, 3b are both normal, the fault detection voltage $V_6$ is higher than the predetermined reference voltage $V_8$ so that the output level of the comparator remains low to maintain the transistor 11 in off state. As a result, the indicator lamp 12 remains deenergized. However, if there is a disconnection or disconnections in one or both of the squibs 3a, 3b, the fault detection voltage $V_6$ becomes lower than the predetermined reference voltage $V_8$ so that the output level of the comparator 10 goes high to thereby turn the transistor 11 on. As a result, the indicator lamp 12 goes on to indicate the disconnection of one or both of the squibs 3a, 3b.

Figure 3:
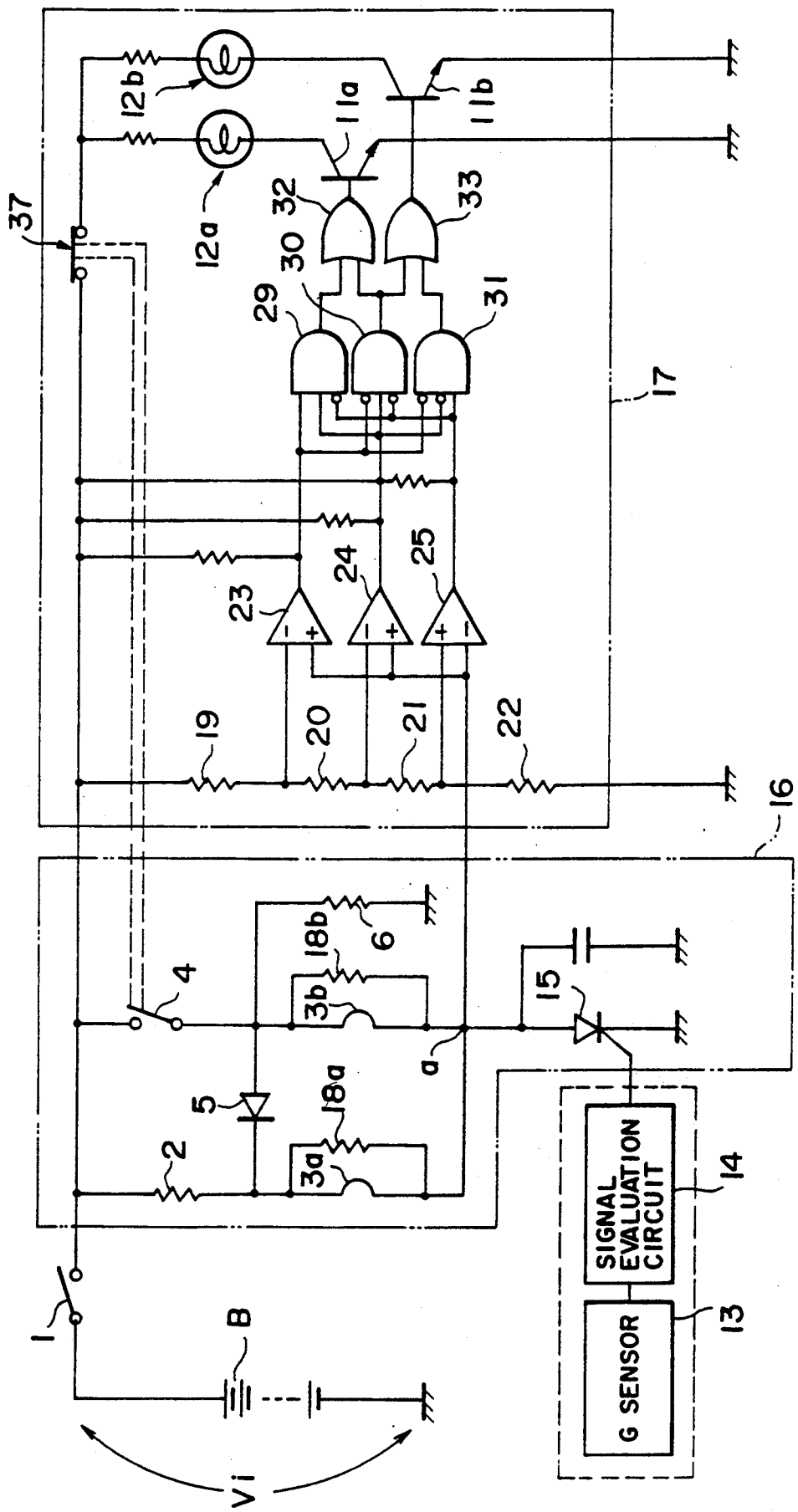
FIG. 3 is a circuit diagram of a third embodiment of the invention.

FIG. 3 shows a third embodiment of the invention. The third embodiment is different from the first and second embodiments in that it is capable of detecting which of the squibs 3a, 3b has a disconnection therein. In FIG. 3, the same reference numerals are used to designate component parts like or corresponding to those of the first embodiment shown in FIG. 1, and detailed description thereof is therefore omitted. In the third embodiment, resistances 18a and 18b are connected, respectively, in parallel with the squibs 3a, 3b, and the junction a between the squibs 3a, 3b is connected to the input of the fault detection circuit 17. In the fault detection circuit 17, three comparators 23 24, and 25 are connected in parallel with each other such that the non-inverting input terminals of the comparators 23, 24 are connected to the junction a, whereas the inverting input terminals of the comparators 23, 24 as well as the non-inverting input terminal of the comparator 25 are connected to respective junctions between serially connected resistances 19 and 20, 20 and 21, and 21 and 22. Respective output terminals of the comparators 23, 24, and 25 are connected to associated input terminals of AND gate circuits 29, 30, and 31. The AND gate circuits 29, 30 have output terminals thereof connected, respectively, to associated input terminals of OR gate circuits 32, 33, whereas the AND gate circuit 30 has an output terminal thereof connected to the other input terminals of the OR gate circuits 32, 33. The OR gate circuits 32, 33 have output terminals thereof connected, respectively, to associated transistors 11a, 11b for driving indicator lamps 12a, 12b.

Figure 4:
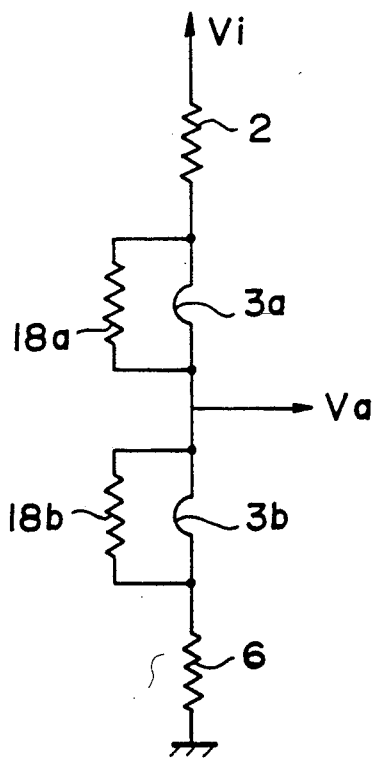
FIG. 4 is an equivalent circuit of essential parts of the fault detecting device of FIG. 3.

FIG. 4 shows an equivalent circuit of essential parts of the squib circuit 16 under the condition that the vehicle undergoes normal deceleration below the predetermined value (with the deceleration sensing switch 4 open). Provided that the resistance values of the resistances 2, 6, 18a 18b are designated by $R_2$, $R_6$, $R_{18a}$, and $R_{18b}$, respectively, and the internal resistance values of the squibs 3a, 3b are designated by $R_{3a}$ and $R_{3b}$, respectively, the respective resistance values of the resistances $R_2$, $R_6$, $R_{18a}$, and $R_{18b}$ are set in such a relationship that $R_2 = R_6 = R_{18a} = R$, $R_{18b} = R \times 2$, $R_{18a} > R_{3a}$, and $R_{18b} > R_{3b}$. With such arrangement, the fault detection voltage Va at the junction a in FIG. 3 changes depending upon the presence or absence of disconnection in the squibs 3a, 3b, as follows:

(1) When there is no disconnection in either of the squibs 3a, 3b, $$Va = \frac{R6}{R2 + R6} Vi = \frac{Vi}{2}$$

(2) When there is a disconnection in the squib 3a alone, $$Va = \frac{R6}{R2 + R18a + R6} Vi = \frac{Vi}{3}$$

(3) When there is a disconnection in the squib 3b alone, $$Va = \frac{R18b + R6}{R2 + R18b + R6} Vi = \frac{3}{4} Vi$$

(4) When there are disconnections in both of the squibs 3a, 3b, $$Va = \frac{R18b + R6}{R2 + R18a + R18b + R6} Vi = \frac{3}{5} Vi$$

The respective resistance values of the resistance 19 through 22 are set such that $3/5 Vi < V_{23a} < 3/4 Vi$, $Vi/2 < V_{24a} < 3/5 Vi$, $Vi/3 < V_{25a} < Vi/2$, provided that the respective predetermined reference voltages applied to the inverting input terminals of the comparators 23, 24, and the non-inverting input terminal of the comparator 25 are designated by $V_{23a}$, $V_{24a}$, and $V_{25a}$, respectively.

Therefore, the fault detection circuit 17 arranged as above forms a logic circuit which operates based on the following truth value table:

| | SQUIB | | COMPARATOR | | | AND CIRCUIT | | | OR CIRCUIT | | INDICATOR LAMP |
|---|---|---|---|---|---|---|---|---|---|---|---|
| No | 3a | 3b | 23 | 24 | 25 | 29 | 30 | 31 | 32 | 33 | (12a, 12b) |
| 1 | ○ | ○ | 0 | 0 | 0 | 0 | 0 | 0 | 0 | 0 | 12a,12b OFF |
| 2 | ○ | x | 0 | 0 | 1 | 0 | 0 | 1 | 0 | 1 | 12b ON |
| 3 | x | ○ | 1 | 1 | 0 | 1 | 0 | 0 | 1 | 0 | 12a ON |

-continued

| | SQUIB | | COMPA-RATOR | | | AND CIRCUIT | | OR CIRCUIT | | INDICATOR LAMP |
|---|---|---|---|---|---|---|---|---|---|---|
| No | 3a | 3b | 23 | 24 | 25 | 29 | 30 | 31 | 32 | 33 | (12a, 12b) |
| 4 | x | x | 0 | 1 | 0 | 0 | 1 | 0 | 1 | 1 | 12a,12b ON |

∘: NORMAL
x: DISCONNECTED

As will be understood from the truth value table, when there is no disconnection in the squib 3a, but there is a disconnection in the squib 3b, the output level of the comparator 25 is high so that the AND gate 31 and the OR gate 33 both have a high level output, which causes the transistor 11b to be turned on for lighting the indicator lamp 12b.

On the other hand, when there is a disconnection in the squib 3a, but there is no disconnection in the squib 3b, the indicator lamp 12a is lit in a similar manner.

In this way, in whichever of the squibs 3a, 3b a disconnection or disconnections may occur, it is possible to immediately locate a squib or squibs under disconnection based on the indication of the indicator lamps 12a, 12b.

In the third embodiment described above, a switch 37 is provided in the fault detection circuit 17 which operates in response to operation of the deceleration sensing switch 4, in order to prevent that closing of the deceleration sensing switch 4 affects the fault detection voltage Va and hence causes erroneous lighting of the indicator lamps 12a, 12b.

Further, although two squibs are used in the above described embodiments, the invention may be applied to an arrangement in which three or more squibs are used.

Figure 5:
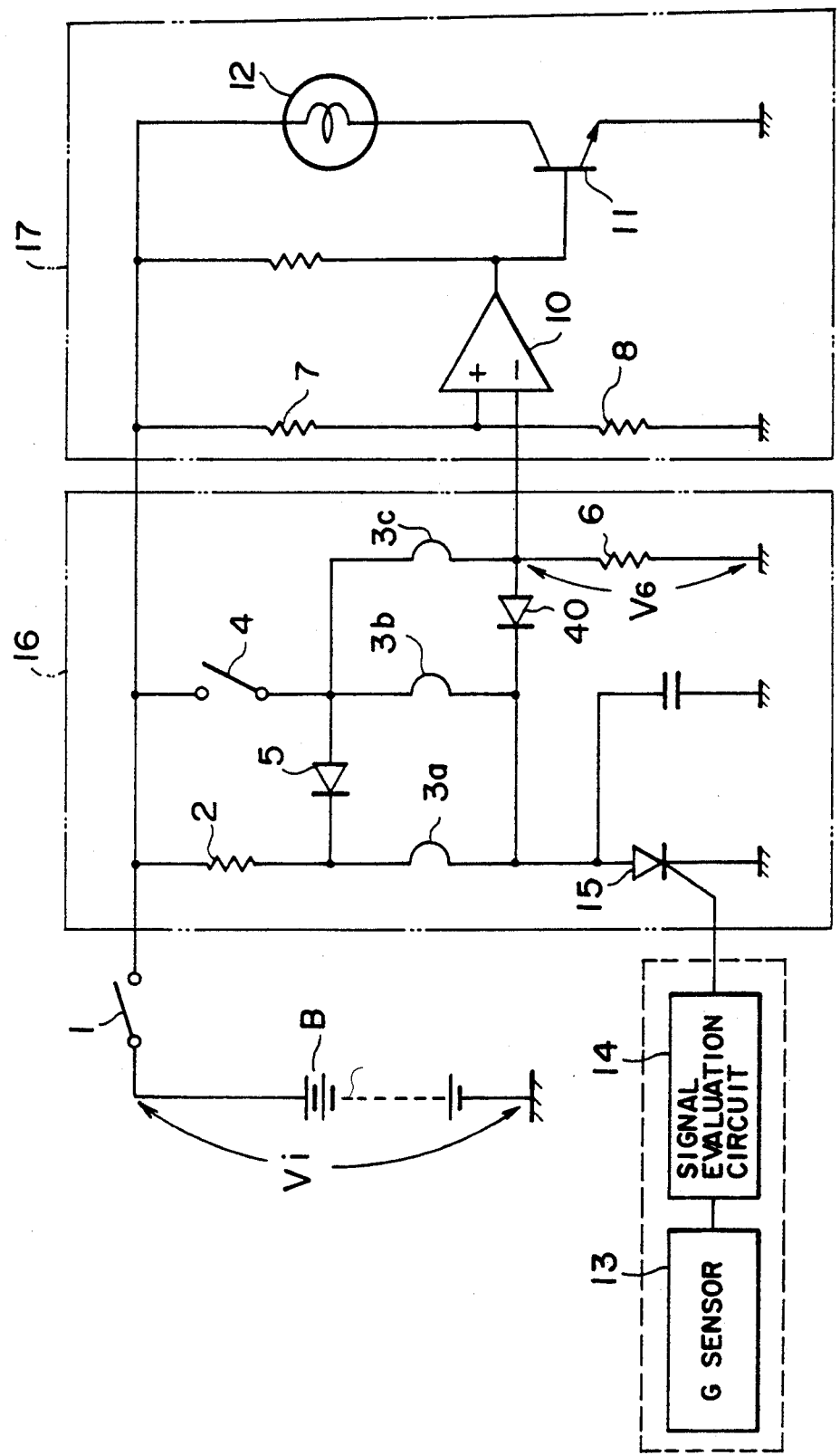
FIG. 5 is a circuit diagram of a fourth embodiment of the invention.

FIG. 5 shows a fourth embodiment of the invention. The fourth embodiment is different from the first embodiment in that the device includes three squibs 3a, 3b, and 3c and to unilateral conductive diodes 5 and 40 in the squib circuit 16. In FIG. 5, the same reference numerals are used to designate component parts like or corresponding to those of the first embodiment shown in FIG. 1, and detailed description thereof is therefore omitted. In the fourth embodiment, the squib 3c is connected between the junction of the deceleration sensing switch 4 with the squib 3b, and the junction of the inverting input terminal of the comparator 10 with the resistance 6. The unilateral conductive diode 40 is connected between the junction of the squib 3a with the cathode terminal of the diode 15, and the junction of the inverting input terminal of the comparator 10 with the resistance 6.

With such arrangement, if two conditions, i.e. (1) the deceleration sensing switch 4 is closed, and (2) the thyristor 15 is turned on, are both satisfied, the power supply voltage Vi from the power supply B is applied through the closed deceleration sensing switch 4 directly to the squib 3b and the squib 3c as well as to the squib 3a through the diode 5, thereby causing the occupant protective system to operate for protection of occupants.

On the other hand, when the vehicle undergoes normal deceleration below the predetermined value, the deceleration sensing switch 4 remains open. On this occasion, if there is no disconnection in any of the squibs 3a, 3b, 3c, a slight amount of current flows from the battery B through the ignition switch 1, the resistance 2, the squib 3a, the squib 3b, the squib 3c, and the resistance 6, in the mentioned order, whereby a fault detection voltage $V_6$ is developed across the resistance 6. The fault detection voltage $V_6$ is supplied to the inverting input terminal of the comparator 10 and compared with the predetermined reference voltage at the junction between the resistances 7, 8. The slight amount of current flows through the resistance 2, the squib 3a, the squib 3b, the squib 3c, and the resistance 6 while no current flows through the diode 5 and the diode 40, whereby the fault detection voltage $V_6$ is higher than the predetermined reference voltage. Consequently, the output level of the comparator 10 remains low so that the transistor 11 remains off, and the indicator light 12 remains deenergized.

However, if a disconnection or disconnections occurs in any or all of the squibs 3a, 3b, 3c, no current is supplied to the resistance 6 through any of the diodes 5, 40 and the squibs 3a, 3b, 3c so that the fault detection voltage $V_6$ assumes 0V lower than the predetermined reference voltage. Consequently, the output level of the comparator 10 goes high so that the transistor 11 is turned on to cause the indicator lamp 12 to be lit for indication of the disconnection of any of the squibs 3a, 3b, 3c.

Although in the above described embodiments, a disconnection or disconnections in the squibs is detected as a fault in the occupant protective system, alternatively, other faults, such as short circuit in the squibs and disconnection of the squibs from their neighboring parts and/or their wiring, may be detected.

What is claimed is:

1. In a fault detection device for an occupant protective system for use in an automotive vehicle, said occupant protective system having a plurality of squibs, a power supply for supplying electric current to said squibs, a power supply switch connected to said power supply, and actuating means for generating a common signal for actuating said squibs to operate said system when said vehicle undergoes deceleration in excess of a predetermined value, said squibs being connected in parallel with each other with respect to said actuating means for causing at least a predetermined amount of electric current as said common signal to flow in parallel through said squibs, the improvement comprising:
a squib circuit having said squibs;
at least one resistance connected to said squibs for allowing a slight amount of electric current which is smaller than said predetermined amount of electric current to flow through said squibs when said power supply switch is activated;
at least one unilateral conductive element connected to said squibs and said at least one resistance for normally causing said slight amount of electric current to flow in series through said squibs; and
a fault detection circuit for detecting a fault in any of said squibs at one time by comparing a potential at a predetermined point in said squib circuit with at least one predetermined reference voltage.

2. A fault detection device as claimed in claim 1, comprising a first resistance having one end thereof connected to said power supply switch, a second resistance having one end thereof grounded, first and second squibs serially connected between said first and second resistances, and a diode having a cathode terminal thereof connected to a first junction between said first resistance and said first squib and an anode terminal thereof connected to a second junction between said second resistance and said second squib.

3. A fault detection device as claimed in claim 2, wherein said fault detection circuit comprises a comparator having one input terminal thereof connected to said predetermined point in said squib circuit and supplied with said potential at said predetermined point in said squib circuit and another input terminal thereof supplied with a predetermined reference voltage, said comparator having a predetermined output level when said potential at said predetermined point in said squib circuit is not in a predetermined relationship with said predetermined reference voltage, and means for giving a warning based upon said predetermined output level of said comparator.

4. A fault detection device as claimed in claim 1, comprising a first resistance having one end thereof connected to said power supply switch, a second resistance having one end thereof grounded, first and second squibs serially connected between said first and second resistances, a diode having a cathode terminal thereof connected to a first junction between said first resistance and said first squib and an anode terminal thereof connected to a second junction between said second resistance and said second squib, and a plurality of third resistances connected, respectively, in parallel with said first and second squibs.

5. A fault detection device as claimed in claim 4, wherein said fault detection circuit comprises a plurality of comparators having respective one input terminals thereof connected to said predetermined point in said squib circuit and supplied with said potential at said predetermined point in said squib circuit and respective other input terminals thereof supplied with predetermined reference voltages different in value from each other, said plurality of comparators having respective predetermined output levels when said potential at said predetermined point in said squib circuit is not in a respective predetermined relationship with respective corresponding ones of said predetermined reference voltages, and means for giving a plurality of different warnings based upon combinations of said respective predetermined output levels of said comparators.

6. A fault detection device as claimed in claim 2, 3, 4 or 5, further including switching means connected between said power supply switch and said second junction in parallel with said first resistance, said switching means being closed when said vehicle undergoes deceleration in excess of said predetermined value.

7. A fault detection device as claimed in claim 1, comprising a resistance having one end thereof grounded, first and second squibs serially connected between said power supply switch and said resistance, and a diode connected in parallel with said first and second squibs such that said diode has an anode terminal thereof connected to said power supply switch and a cathode terminal thereof connected to a junction between said second squib and said resistance.

8. A fault detection device as claimed in claim 7, wherein said fault detection circuit comprises a comparator having one input terminal thereof connected to said junction and supplied with said potential at said predetermined point in said squib circuit and another input terminal thereof supplied with a predetermined reference voltage said comparator having a predetermined output level when said potential at said predetermined point in said squib circuit is not in a predetermined relationship with said predetermined reference voltage, and means for giving a warning based upon said predetermined output level of said comparator.

* * * * *